(12) United States Patent
Nyberg et al.

(10) Patent No.: US 7,995,760 B2
(45) Date of Patent: Aug. 9, 2011

(54) METHOD FOR ENSURING DATA TRANSMISSION SECURITY, COMMUNICATION SYSTEM AND COMMUNICATION DEVICE

(75) Inventors: Kaisa Nyberg, Helsinki (FI); Valtteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 10/164,437

(22) Filed: Jun. 5, 2002

(65) Prior Publication Data
US 2002/0186846 A1 Dec. 12, 2002

(30) Foreign Application Priority Data
Jun. 8, 2001 (FI) .................................. 20011215

(51) Int. Cl.
*H04K 1/00* (2006.01)
*H04L 9/32* (2006.01)
(52) U.S. Cl. ........................ 380/273; 713/171
(58) Field of Classification Search .................. 380/277, 380/273; 713/171
See application file for complete search history.

(56) References Cited

U.S. PATENT DOCUMENTS

| | | | | |
|---|---|---|---|---|
| 4,200,770 A | | 4/1980 | Hellman et al. | |
| 4,238,853 A | * | 12/1980 | Ehrsam et al. | 380/45 |
| 4,465,153 A | * | 8/1984 | van de Pas et al. | 380/47 |
| 4,823,388 A | * | 4/1989 | Mizutani et al. | 705/67 |
| RE33,189 E | * | 3/1990 | Lee et al. | 380/239 |
| 4,995,081 A | * | 2/1991 | Leighton et al. | 713/186 |
| 5,159,632 A | * | 10/1992 | Crandall | 380/28 |
| 5,159,633 A | * | 10/1992 | Nakamura | 380/30 |
| 5,204,901 A | * | 4/1993 | Hershey et al. | 380/285 |
| 5,227,613 A | * | 7/1993 | Takagi et al. | 235/380 |
| 5,241,599 A | * | 8/1993 | Bellovin et al. | 713/171 |
| 5,337,357 A | * | 8/1994 | Chou et al. | 705/56 |
| 5,446,796 A | * | 8/1995 | Ishiguro et al. | 705/66 |
| 5,572,571 A | * | 11/1996 | Shirai | 455/551 |
| 5,677,954 A | * | 10/1997 | Hirata et al. | 380/257 |
| 5,719,940 A | * | 2/1998 | Ahn et al. | 713/176 |
| RE36,310 E | * | 9/1999 | Bjerrum et al. | 713/168 |

(Continued)

FOREIGN PATENT DOCUMENTS
EP 0 810 559 12/1997

(Continued)

OTHER PUBLICATIONS

"The Resurrecting Duckling: Security Issues for Ad-Hoc Wireless Networks", 1999 At&T Software Symposium, by F. Stajano, R. Anderson.

(Continued)

*Primary Examiner* — Techane Gergiso
(74) *Attorney, Agent, or Firm* — Ware, Fressola, Van Der Sluys & Adolphson LLP

(57) ABSTRACT

The invention relates to a method for ensuring data transmission security between a first and a second communication device in short-range wireless communication. To set up a secure data transmission connection, the communication devices conduct a key exchange stage to generate at least one shared key between the communication devices. After said key exchange stage at least a first and a second check string is formed, said strings being based at least on a unique short random string and on the keys generated in each communication device at said key exchange stage. Thus, the security of the connection that is set up is ensured by comparing the correspondence of said check strings. The invention also relates to a communication system and a communication device, in which the method will be applied.

27 Claims, 4 Drawing Sheets

U.S. PATENT DOCUMENTS

| | | | |
|---|---|---|---|
| 5,966,445 A | 10/1999 | Park et al. | |
| 6,049,612 A * | 4/2000 | Fielder et al. | 380/44 |
| 6,052,466 A * | 4/2000 | Wright | 380/262 |
| 6,058,476 A * | 5/2000 | Matsuzaki et al. | 713/169 |
| 6,141,750 A * | 10/2000 | Micali | 713/168 |
| 6,151,395 A * | 11/2000 | Harkins | 380/286 |
| 6,173,400 B1 * | 1/2001 | Perlman et al. | 713/172 |
| 6,230,272 B1 * | 5/2001 | Lockhart et al. | 726/2 |
| 6,539,479 B1 * | 3/2003 | Wu | 713/151 |
| 6,681,017 B1 * | 1/2004 | Matias et al. | 380/277 |
| 6,816,970 B2 * | 11/2004 | Morgan et al. | 713/183 |
| 6,904,526 B1 * | 6/2005 | Hongwei | 713/182 |
| 2001/0010080 A1 * | 7/2001 | Walter et al. | 713/202 |
| 2002/0018571 A1 * | 2/2002 | Anderson et al. | 380/277 |
| 2002/0073322 A1 * | 6/2002 | Park et al. | 713/188 |
| 2002/0101993 A1 * | 8/2002 | Eskin | 380/270 |
| 2003/0102959 A1 * | 6/2003 | Bitzer | 340/5.21 |

FOREIGN PATENT DOCUMENTS

| | | |
|---|---|---|
| JP | 04-196683 | 7/1992 |
| JP | 04-347949 | 12/1992 |
| JP | 10-030367 | 2/1998 |
| JP | 2003-510896 | 3/2003 |
| JP | 06-350597 | 12/2004 |
| WO | 9852136 | 11/1998 |
| WO | 0122661 | 3/2001 |

OTHER PUBLICATIONS

"*The Resurrecting Duckling: Security Issues for Ad-hoc Wireless Networks*," by Frank Stajano and Ross Anderson, 1999 AT&T Software Symposium, Sep. 15, 1999.

Shinichi Ikeno, Kenji Koyama, "Modern Cryptography," Japan, The Institute of Electronics, Information and Communication Engineers, Nov. 15, 1997, first edition, issue six, p. 175-177.

* cited by examiner

METHOD FOR ENSURING DATA TRANSMISSION SECURITY, COMMUNICATION SYSTEM AND COMMUNICATION DEVICE

TECHNICAL FIELD OF THE INVENTION

The present invention relates to a method for ensuring data transmission security between a first and a second communication device in short-range wireless communication in which, to set up a data transmission connection, the communication devices conduct a key exchange stage to exchange at least two keys between the communication devices, and on the basis of said exchanged keys at least one encryption key is derived in the communication devices. The invention also relates to a communication system that comprises at least a first and a second communication device, means for setting up a short-range wireless data transmission connection between said first and second communication device and means for ensuring the data transmission security in the data transmission connection, comprising means for conducting a key exchange stage to exchange at least two keys between the communication devices, and means for deriving at least one encryption key on the basis of the exchanged keys in the communication devices. Moreover, the invention relates to a communication device that comprises at least means for setting up a short-range wireless data transmission connection between the communication device and another communication device and means for ensuring data transmission security in the data transmission connection, comprising means for conducting a key exchange stage with another communication device to exchange at least two keys between the communication devices, and means for deriving at least one encryption key on the basis of the exchanged keys. The invention further relates to a communication system that comprises at least a first and a second communication device, means for setting up a short-range wireless data transmission connection between said first and second communication device, and means for ensuring data transmission security in the data transmission connection, comprising means for conducting a key exchange stage to exchange at least two keys between the communication devices, and means for deriving at least one encryption key on the basis of the exchanged keys in the communication devices. The invention further relates to a wireless communication device that comprises at least means for setting up a short-range wireless data transmission connection between the wireless communication device and another communication device, and means for ensuring data transmission security in the data transmission connection, comprising means for conducting a key exchange stage with another communication device to exchange at least two keys between said wireless communication device and said another communication device, and means for deriving at least one encryption key on the basis of the exchanged keys.

BACKGROUND OF THE INVENTION

In this specification the concept of short-range wireless data transmission connection refers primarily to such connections in which two or more devices that are located relatively close to each other can communicate with each other in a wireless manner. In the communication it is possible to apply for example radio communication, infrared communication, inductive communication, or the like. For example the Bluetooth™ technology, in which low-power radio transmitters and radio receivers are used, has been developed for the purpose of short-range radio communication. Such devices can communicate with each other and thereby form an ad hoc communication system. By applying short-range communication technology it is for example possible to connect peripheral devices to a computer in a wireless manner. Furthermore, for example a wireless communication device can be coupled to a portable computer, wherein from the computer it is possible to have a wireless connection to another communication network, such as the Internet data network. Thus, a situation may occur in which, the user has to enter his/her user identification and password when he/she is setting up a connection to a data network by means of the portable computer. Thus, there is a risk that it is possible to eavesdrop the user identification and password transmitted without encryption between the portable computer and a wireless communication device connected thereto with a short-range wireless connection.

Other possible implementation areas for short-range data transmission connections that can be mentioned in this context include wireless local area network (WLAN), wireless pay terminal system and wirelessly operating lock. By means of a wireless local area network it is for example in small office facilities possible to implement a local area network comprising several computers without having to conduct cabling. In a wireless pay terminal system the user can pay bills for example by means of a wireless communication device which also contains short-range communication means. Thus, a short-range data transmission connection is set up between the wireless communication device and the pay terminal for the purpose of paying bills. Correspondingly, in a wirelessly operating lock the user has a key that communicates wirelessly with the lock to ensure that the key in question is intended for controlling the function of this particular lock. Such a key may be implemented as a separate key, or it may be implemented in connection with another device, such as a wireless communication device.

In such communication systems it is problematic how the different parties in the communication can be sure that the devices in question are really authorized to the communication process. This is important especially in such situations where confidential information is transferred between different devices. For example in the aforementioned pay terminal embodiment the pay terminal has to ensure that the device used in the payment transaction really is the device used by the account holder in question or a person authorized by the account holder. Also in the lock embodiment the lock has to ensure the authenticity of the key before the lock is opened. In such embodiments, for the purpose of verifying the parties, the communication between the devices has to be protected as well as possible from outside intruders, such as eavesdroppers and intervening parties. To take these safety aspects into account, different encryption mechanisms have been developed e.g. for said Bluetooth™ systems. The techniques that are used include e.g. a key pair (PKI, Public Key Infrastructure) composed of a public key and a private key. In such an arrangement the user has a public key that he/she can send to a counterparty without encryption, and a private key which does not have to be transferred to the communication system at any stage, but the user has to keep it concealed. Thus, it is possible to transmit encrypted information to the user by encrypting the information with said public key. The user can decrypt the information with his/her private key.

One drawback of the asymmetric encryption system of the above kind is that it is relatively slow, wherein encryption of large amounts of information considerably decelerates data transmission. Communication systems also apply symmetric encryption methods in which both parties of the communication share the same private key (shared key, shared secret). A problem in this arrangement is, for example, how this private key can be transmitted to another device so that an outsider cannot find out the private key. In some cases the user himself/herself can enter this private key to different devices. In a device according to the Bluetooth™ system this private key is utilized to calculate a link key used in the radio communication, by means of which link key the actual information to be transmitted is encrypted. The maximum length determined for the link key is 128 bits, wherein the length of the private key should be at least 32 characters. It is laborious to enter such a string containing 32 characters, and there is high probability of errors, especially when the string has to be entered successively at least twice without errors before the connection can be set up.

The U.S. Pat. No. 5,241,599 discloses a method for encrypted key exchange (EKE), in which the encryption key used in the communication is first encrypted with a short encryption key, whereafter the encryption key can be transmitted in the encrypted format from one device to another via an unencrypted communication channel. In short-range systems this method can be applied in such a manner that the user enters said short encryption key to both devices, whereafter both devices transmit the encryption key of their own to the other device, encrypted with a short encryption key. Such systems have for example the drawback that the encryption efficiency is dependent for example on that how often the user changes this short encryption key. Furthermore such a short encryption key selected by the user can be guessed relatively easily, and therefore when the method is applied, it is possible that outsiders find out the short encryption key.

There is a known so-called Diffie-Hellman method, which is based on exponentiation modulo a large prime number. On the basis of this, the difficulty in breaking encryption implemented with the Diffie-Hellman method is today regarded directly proportional to the difficulty of calculating discrete logarithms modulo a large prime number. The Diffie-Hellman method is a public key based algorithm generally used especially in key exchange. The method is considered safe when keys of sufficient length and an appropriate DH generator are used. In the Diffie-Hellman method the first party determines a first key number on the basis of a first secret number and the first key number is transmitted to the second party. Correspondingly, the second party determines a second key number on the basis of a second secret number and the second key number is transmitted to the first party. Thereafter the first party generates a third key number on the basis of the first secret number and the second key number it has received, and the second party generates a fourth key number on the basis of the second secret number and the first key number it has received. The third and the fourth key numbers are identical, and they are not transmitted between the parties involved. The third and the fourth key number can thereafter be used for encryption and decryption of information to be transmitted between the parties. In this arrangement it is, however, possible that a third party is capable of changing the first key number or the second key number. This takes place for example in such a manner that a third party places itself between the first and the second party (MIM, Man In the Middle), wherein the first party mistakes the third party for the second party, and, in a corresponding manner, the second party mistakes the third party for the first party. Thus, in practise, data is transmitted between the first and the second party via the third party, and the third party detects both the messages transmitted by the first party and the messages transmitted by the second party, and is capable of modifying them. The Diffie-Hellman method is described in more detail in the U.S. Pat. No. 4,200,770 to which reference is made in this context.

An improvement has been suggested for the Diffie-Hellman method, by means of which different parties in a short-range wireless communication method can be verified. The method is disclosed in the publication F. Stajano, R. Anderson, The Resurrecting Duckling: Security Issues for Ad-Hoc Wireless Networks, 1999 AT&T Software Symposium. The method disclosed in this publication is based on the fact that both parties check that the third and the fourth encryption numbers obtained as a result of the actions described above are identical. This can be conducted for example in such a manner that the calculated encryption numbers are displayed in the devices of both parties and the users of the devices compare these numbers with each other. However, to attain a sufficiently strong encryption (an encryption key of at least 128 bits) the encryption numbers have to be strings composed of at least 32 characters. It is difficult to compare such strings which are relatively long, and the error probability is high.

SUMMARY OF THE INVENTION

It is an aim of the present invention to provide an improved method to ensure data transmission security, a communication system and a communication device. The invention is based on the idea that a short unique random string is selected, on the basis of which a check code is calculated in both devices and the calculated check code is shown either in one device or in both devices. If both devices show the check code they have calculated, they codes can be compared with each other. If only one device shows the check code, it is input to the other device, in which the input check code is compared to a check code calculated in the device. More precisely, the method according to the present invention is primarily characterized in that in said key exchange stage at least a first and a second check string are generated, said check strings being based at least on the keys derived in said key exchange stage, and that the security of the established connection is ensured by comparing the correspondence of said check strings. The communication system according to the present invention is primarily characterized in that the means for ensuring data transmission security in a data transmission connection comprise means for forming at least a first and a second check string which are based at least on the keys derived at said key exchange stage, and means for comparing the correspondence of said check strings. The communication device according to the present invention is primarily characterized in that the means for ensuring data transmission security in a data transmission connection comprise means for generating at least one check string which is based at least on the keys derived at said key exchange stage, and means to be used for comparing the correspondence of said check strings. The communication system according to another embodiment of the present invention is primarily characterized in that the communication system comprises means for determining a first encryption key in the first communication device, means for determining a second encryption key in the second communication device, means for determining a link encryption key for encryption of information to be transmitted in the data transmission connection, means for selecting a random check string, the means for ensuring data transmission security comprise means for forming a first check string in the first communication device at least on the basis of said first encryption key and said random string and means for forming a second check string in the second communication device at least on the basis of said second encryption key and said random string, and the communication system further comprising means for comparing said first check string and said second check string, wherein, if said check strings correspond to each other, the link encryption key selected at said key exchange stage is arranged to be used in the data transmission connection. The wireless communication device according to the present invention is primarily characterized in that the means for ensuring data transmission security comprise means for forming at least one check string, said string being based at least on the keys exchanged at said key exchange stage, and means for comparing the correspondence of said check strings.

The present invention shows remarkable advantages compared to solutions of prior art. When the method according to the invention is applied, it is possible to verify the parties involved in the communication without having to use long and complex encryption keys or check numbers in the verification. It is not necessary for the user himself/herself to enter any identification numbers in the beginning of a connection set-up, but the set-up of a connection is started normally by selecting for example a second device from a menu which is formed in the device for this purpose. Since one-time check strings are used in the method according to the invention, it is not easy to guess the check strings and, on the other hand, because the same check string is not used the next time authentication is performed, outsiders will not have any use for the check strings detected afterwards. Thus, a better security of the communication system is thus obtained than when solutions of prior art are used.

BRIEF DESCRIPTION OF THE DRAWINGS

In the following, the invention will be described in more detail with reference to the appended drawings, in which.

DETAILED DESCRIPTION OF THE INVENTION

Figure 1:
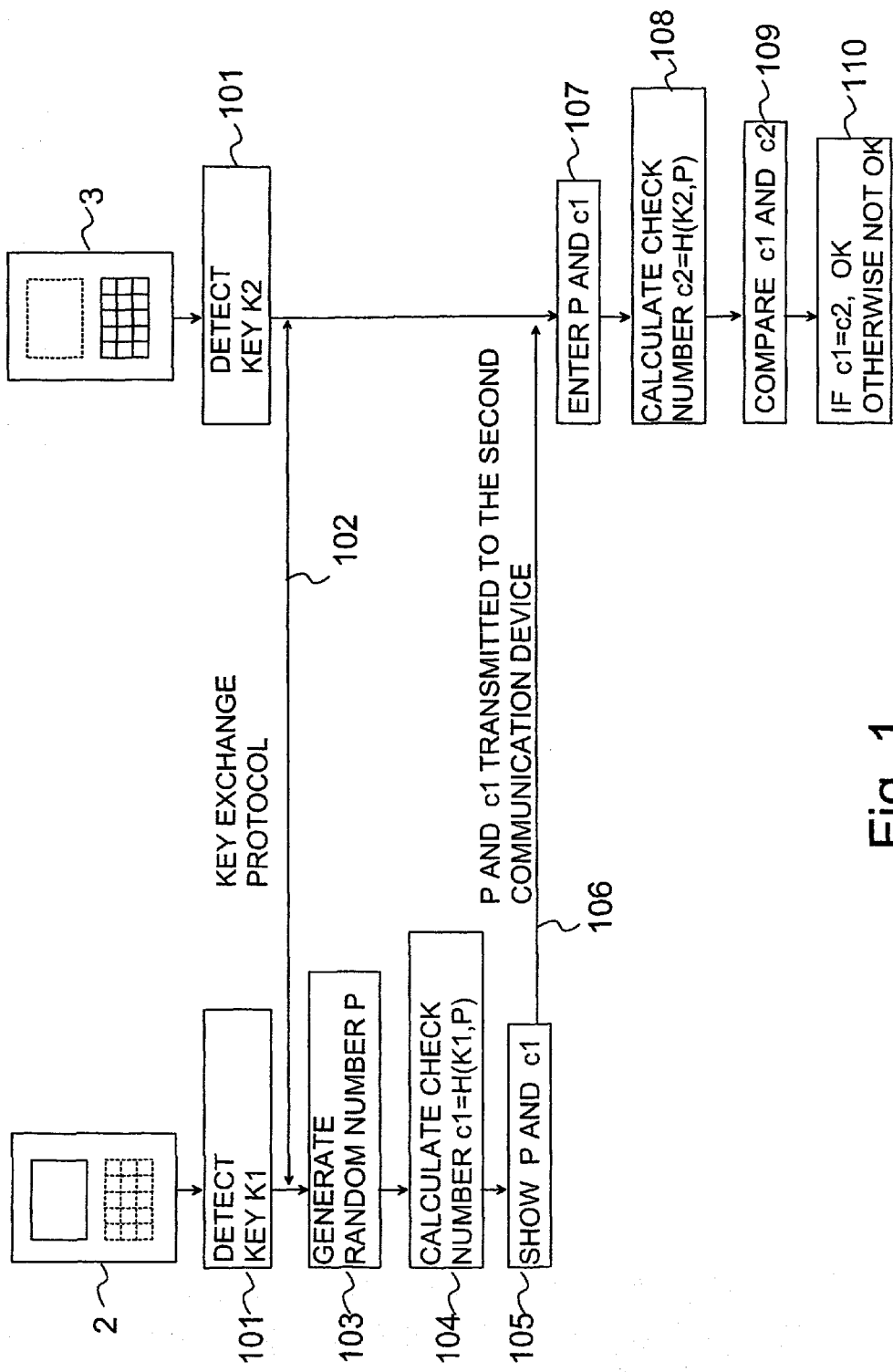
FIG. 1 shows the method according to a preferred embodiment of the invention in a reduced chart.
Figure 4:
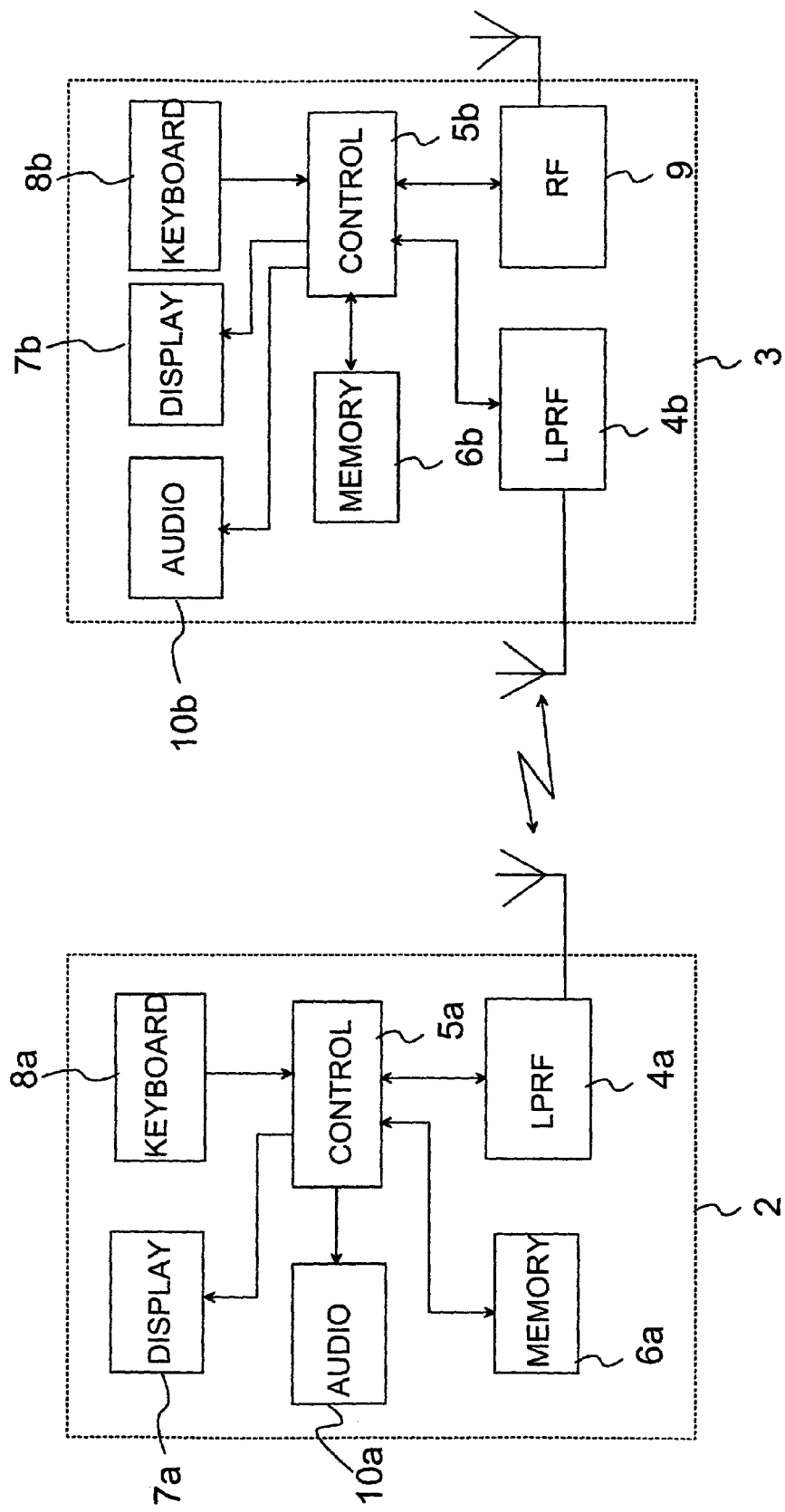
FIG. 4 shows a communication system according to a preferred embodiment of the invention in a reduced chart.

In the following, the operation of the method according to a preferred embodiment of the invention will be described in more detail with reference to the reduced chart shown in FIG. 1 and using the communication system according to FIG. 4 as an example. It comprises a first communication device 2 and a second communication device 3. The first communication device 2 is for example a portable computer (Laptop PC). The second communication device 3 is for example a wireless communication device, such as a mobile phone installed in the user's car. It is, however, obvious that these communication devices 2, are only non-restrictive example embodiments, and the communication devices 2, 3 used in connection with the invention can also differ from those presented herein. The first 2 and the second communication device 3 comprise local communication means 4a, 4b, such as a low power radio receiver (LPRF, Low Power RF), an infrared transmitter and receiver, or the like. By means of the local communication means 4a, 4b the communication devices can communicate with each other wirelessly. Furthermore, the communication devices 2, 3 contain a control block 5a, 5b that advantageously comprises a microprocessor or the like, and a memory 6a, 6b. The system according to a preferred embodiment contains at least in the first communication device 2, 3 a display 7a, 7b for presenting information and at least the second communication device 3 contains input means 8b for inputting information to the second communication device 3. The input means 8b is advantageously a keyboard, but it is obvious that other kinds of input means, such as data input means based on audio control can be applied in this context. The first communication device 2 may also contain input means 8a, although they are not necessary in this method according to a preferred embodiment of the invention. The communication devices 2, 3 may also comprise audio means 10a, 10b, such as an earpiece/a speaker and/or a microphone. In the system according to FIG. 4, the second communication device 3 also comprises mobile station functions, which are illustrated by block 9.

In a situation where the aim is to set up a data transmission connection between the first and the second communication device, the following steps are taken in the method according to this preferred embodiment of the invention. The communication devices 2, 3 aim at detecting whether there are other possible communication devices in the vicinity to which a data transmission connection can be set up. In this context this stage is called a paging stage, and it can be implemented for example in the following manner. At least one communication device 2, 3 transmits paging messages or the like at intervals, and listens to possible reply messages by means of a receiver of the local communication means 4. Thus, in a situation where either of the communication devices 2, 3 transmits a paging message, the communication device 2, 3 that has received the paging message transmits a reply message to the communication device 2, 3 that has transmitted the paging message. The user of the communication device can be presented with a list of other communication devices that are possibly detected in the vicinity. Thus, the user can select one or more communication devices from this list, and a data transmission connection is set up thereto. When the method according to the invention is applied in setting up a data transmission connection, it is not, however, necessary for the user to enter an identification number or the like. In connection with the paging stage the communication devices 2, 3 can transmit the address of their own to the other party involved in the data transmission connection to be set up, wherein these addresses individualizing the communication device 2, 3 are used in the communication thereafter. After the paging stage both communication devices 2, 3 perform an interactive key exchange stage (arrow 102 in FIG. 1) to generate the same secret key K in both devices. The key exchange stage is conducted (arrow 102 in FIG. 1) using for example the Diffie-Hellman key exchange protocol. Thus, in the first communication device parameters a, q are selected, a first secret number X1 is generated, and a first key number Y1 is calculated advantageously by means of the formula $Y1=a^{X1}$ mod q. The first communication device 2 transmits the numerical values a, q, Y1 to the second communication device 3. The second communication device 3 generates a second secret number X2, calculates a second key number by means of the formula $Y2=a^{X2}$ mod q and transmits the second key number Y2 to the first communication device 2. After this key exchange stage a shared encryption key K is calculated in both communication devices 2, 3. The first communication device 2 utilizes the parameter q, the second key number Y2 and the first secret number X1, and computes $K1=(Y2)^{X1}$ mod q. In a corresponding manner, the second communication device 3 utilizes the parameter q, the first key number Y1 and the second secret number X2, and computes $K2=(Y1)^{X2}$ mod q. If the data transmission has been conducted without disturbances, and outsiders have not influenced the data transmission process, it is true that K1=K2, whence both communication devices 2, 3 are aware of the same shared encryption key K (=K1=K2), which can be used for encryption of information to be transmitted via the data transmission connection and for decryption after the parties have checked the authenticity of each other.

If the encryption key produced by the key exchange protocol is longer than the maximum length reserved for the shared encryption key K in the application, it is possible to form the actual shared encryption key K from the encryption key produced in the key exchange protocol, for example by cutting it into suitable length or by selecting predetermined parts thereof. For example in systems based on present Bluetooth™ technology it is possible to use encryption keys with the maximum length of 128 bits as a shared encryption key K.

As was stated earlier in this description, it is possible that a third party has intervened in the key exchange process, thus being able to influence the communication between the first 2 and the second 3 communication device, and thereby having the opportunity of changing the transmitted key numbers Y1, Y2. Thus, it is possible to conduct the next checking stage in which the aim is to find out whether the key exchange stage has been conducted in a reliable manner. In this preferred embodiment of the invention the first communication device 2 selects a unique random string P (block 103 in FIG. 1), which is relatively short, for example 6 characters long. This selection can be conducted in a manner known as such, for example by generating it using a random string generator provided in the application software of the control block. Besides selecting a random string P, the first communication device 2 calculates a first check string c1 (block 104) on the basis of the random string P it has generated and the shared encryption key K. The length of this check string is preferably the same as the length of the random string, i.e. in this example situation 6 characters. The first communication device 2 displays the random string P it has selected and the first check string c1 it has calculated on the display 7*a* (block 105) and the random string P and the check string c1 are reported to the user of the second communication device 3 (arrow 106). The user of the second communication device enters the string (in this example 12 characters) presented by the first communication device 2 with input means 8*b* to the second communication device 3 (block 107). Thereafter a checking stage is conducted in the second communication device 3. Thus, the second communication device calculates a second check string c2 (block 108) on the basis of the random string P and the shared encryption key K entered by the user. Thereafter the second communication device 3 compares the string c1 entered by the user to the calculated second check string c2 (block 109). The second communication device 3 indicates the result of the check for example with a signal and/or on the display 7*b*, advantageously at least when the check strings c1, c2 do not match (block 110). Thus, the user can notice the situation and refrain from starting the data transmission process. If the strings are identical, it can be assumed that the shared encryption key K is reliable, i.e. with a strong probability the key is the same in both devices and it can be used in the data transmission encryption and the data transmission connection between the communication devices 2, 3 can be taken in use.

The information to be transmitted via the data transmission connection set up between the communication devices 2, 3 is thus encrypted in the transmitting communication device with the shared encryption key K, wherein the decryption can be conducted in the receiving communication device with a corresponding shared encryption key K.

In systems based on the Bluetooth™ technology, the aforementioned authentication of the parties has to be conducted only at that stage when two communication devices 2, 3 communicate with each other for the first time. Thus the use and comparison of a relatively short check string according to the invention is fairly easy when compared e.g. to strings of prior art, the length of which is typically at least 32 characters. In some practical embodiments it may be necessary to conduct checkings more than once. Thus, a sufficient security can be attained with an even shorter check string, for example 8 characters may be a sufficient number of characters. Thus, the length of the random string P is 4 characters. Advantageously, the length of the random string is 4 to 8 hexadecimal numbers or 6 to 10 decimal numbers, wherein the corresponding check strings are 8 to 18 hexadecimal numbers or 12 to 20 decimal numbers long.

In the calculation of the first check string c1 and the second check string c2 the same calculation function is used, which is for example a so-called hash function. Such a hash function conducts a conversion for the input m and returns a string of fixed length, which is called the hash value h. Thus, mathematically h=H(m). In this embodiment, the input that is used is the shared encryption key, which in the first communication device is K1 and which in the second communication device is K2, and the random string P. Thus, the first communication device performs an arithmetic operation c1=H(K1,P) and the second communication device performs the same arithmetic operation c2=H(K2,P). One feature of the hash function is that it can be considered as a one-way function, i.e. on the basis of the calculated result it is, in practice, very difficult, or even impossible, to determine the input used in the calculation. It is obvious that instead of the hash function it is also possible to apply another method, such as a block encryption method.

Figure 2:
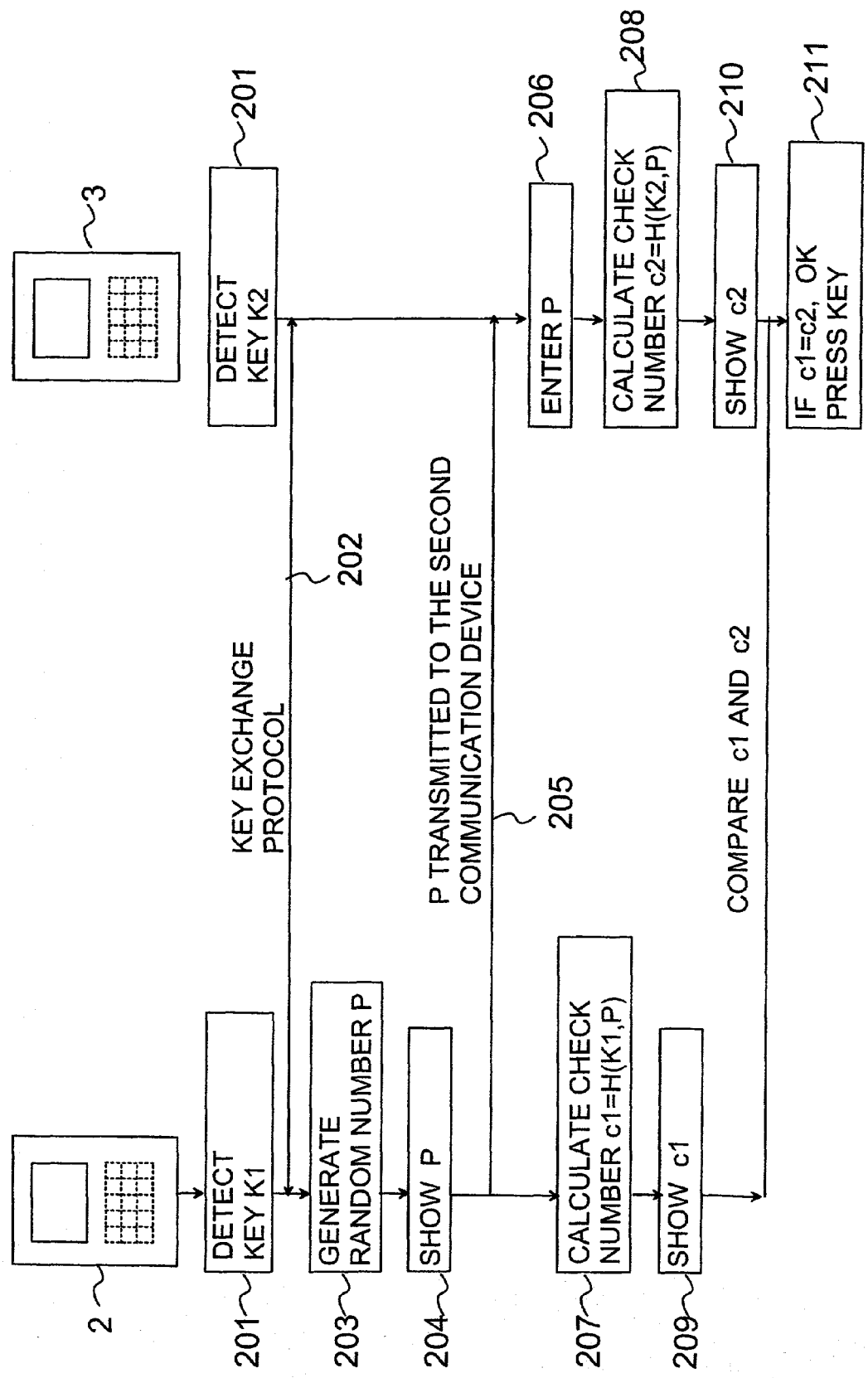
FIG. 2 shows a method according to a second preferred embodiment of the invention in a reduced manner.

In the following, the operation of the method according to a second preferred embodiment of the invention will be described with reference to the reduced chart shown in FIG. 2. This method differs from the preferred embodiment described earlier in this description primarily in that respect that this method according to the second preferred embodiment utilizes the displays 7*a*, 7*b* of both communication devices 2, 3 and the input means 8*b* of the second communication device 3.

In a situation where the aim is to set up a data transmission connection between the first 2 and the second communication device, the following steps are taken in the method according to a second preferred embodiment of the invention. The data transmission devices 2,3 conduct the key exchange stage (block 202) as presented earlier in this description.

In this second preferred embodiment the checking stage is conducted in the following manner. The first communication device 2 selects a relatively short random string P (block 203) and displays the random string P it has selected on the display 7*a* (block 204). The random string P is reported to the user of the second communication device 3 (arrow 205). The user of the second communication device enters the random string P (in this example 6 characters) presented by the first communication device 2 to the second communication device 3 with input means 8*b* (block 206). Thereafter the second communication device 3 calculates a second check string c2 (block 208) on the basis of the random string P entered by the user and the secret key K2 and presents it on a display 7*b* (block 210). The first communication device 2 calculates a first check string c1 (block 207) on the basis of the random string P entered by the user and the secret key K1, and presents it on a display 7*a* (block 209). Thereafter the user of the first communication device 2 and the user of the second communication device compare the calculations of the communication devices and the check strings c1, c2 presented by the same. If the check strings c1, c2 correspond to each other, the user of the second communication device 3 indicates with the input means 8 that the check strings match (block 211). Thus, the shared encryption key K is reliable, and it can be used in the encryption of data transmission and the data transmission connection between the communication devices 2, 3 can be taken in use.

Figure 3:
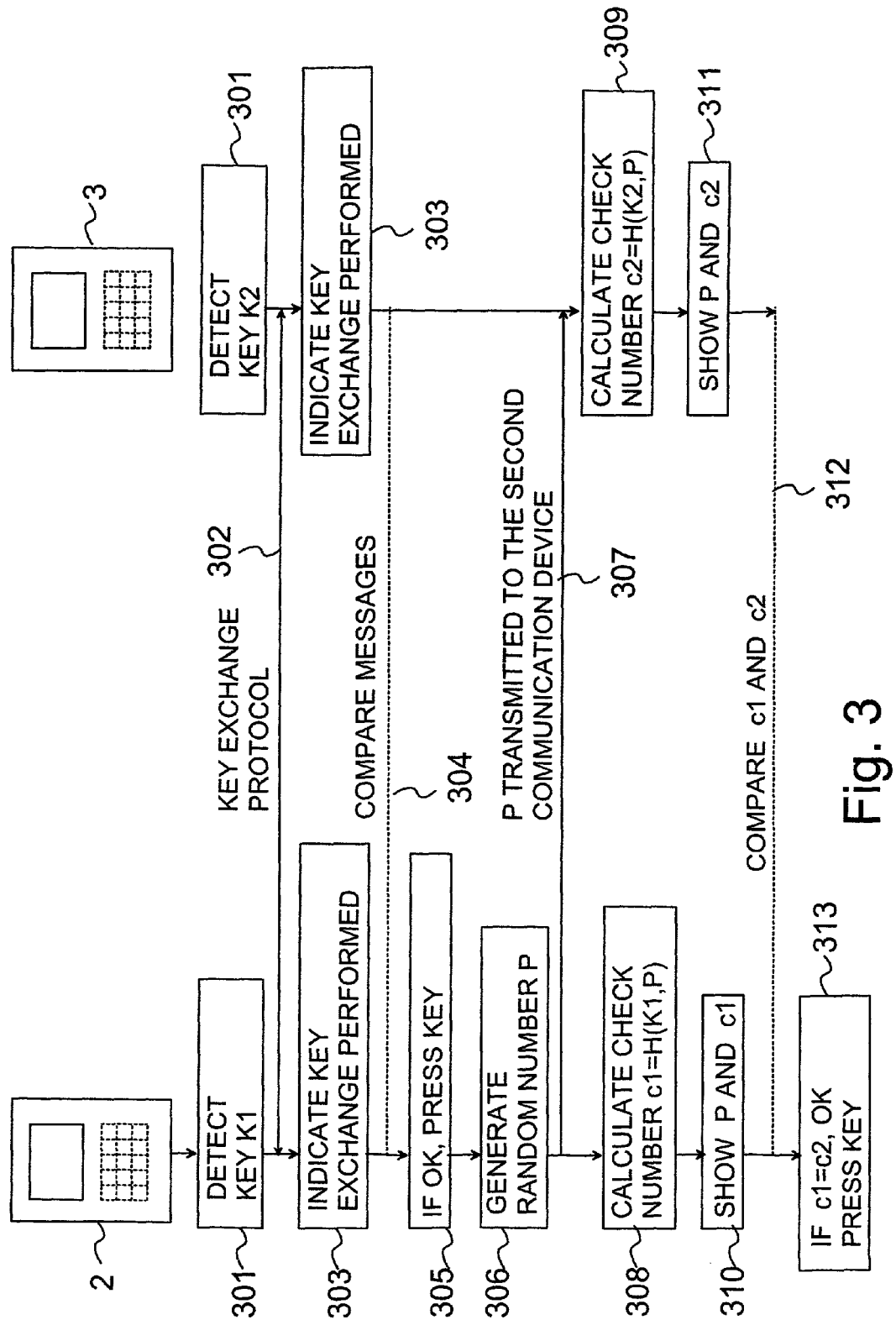
FIG. 3 shows the method according to a third preferred embodiment of the invention in a reduced manner.

FIG. 3 shows the method according to a third preferred embodiment of the invention. Also in this embodiment the secret keys K1, K2 are generated in the communication devices 2, 3 using some suitable key exchange protocol conducted between the communication devices 2, 3 (block 302). Thereafter both communication devices 2, 3 indicate, advantageously on the display 7a, 7b that the key exchange stage has been conducted (block 303) and the users of the communication devices 2, 3 inform each other thereof (block 304) (if the users in question are different). At this stage, the user of the first communication device 2 advantageously informs the first communication device 2 with the input means 8a that the key exchange stage has been conducted (block 305). Thereafter the first communication device 2 selects a first random string P (block 306) and transmits it by means of local communication means 4a to the second communication device 3 (block 307). Furthermore, the first communication device calculates a first check number, c1 (block 308), as was described hereinabove. The second communication device 3 also calculates a second check number c2 in the manner described hereinabove (block 309). After the calculation the first communication device 2 presents the first check number c1 and the random string P on the display 7a (block 310). In a corresponding manner, the second communication device 3 presents the second check number c2 and the random string P on the display 7b (block 311). The users can now compare the values presented by the communication devices 2, 3 and find out whether the authentication of parties has been conducted successfully (block 312). If the presented values match, the user of the first communication device 2 indicates with the input means 8a that a connection can be set up (block 313). As input means 8a for example one key is sufficient, but it is also possible to use a keyboard, audio control means, a pointer device or a corresponding device as input means 8a.

In a method according to yet another preferred embodiment of the invention both communication devices 2, 3 perform an interactive key exchange stage to generate the same secret keys Y1, Y2 in both devices. The key exchange stage is conducted using for example the Diffie-Hellman key exchange protocol. Thus, in the first communication device parameters a, q are selected, a first secret number X1 is generated, and a first key number Y1 is calculated advantageously by means of the formula $Y1=a^{X1}$ mod q. The first communication device 2 transmits the numerical values a, q, Y1 to the second communication device 3. The second communication device 3 generates a second secret number X2, calculates a second key number by means of the formula $Y2=a^{X2}$ mod q and transmits the second key number Y2 to the first communication device 2. After this key exchange stage the first communication device 2 calculates a first check string c1 on the basis of the random string P it has generated and the first Y1 and the second key number Y2. The first communication device 2 displays the random string P it has selected and the first check string c1 it has calculated on the display 7a and the random string P and the check string c1 are reported to the user of the second communication device 3. The user of the second communication device 3 enters the string presented by the first communication device 2 with input means 8b to the second communication device 3. Thereafter a checking stage is conducted in the second communication device 3. Thus, the second communication device calculates a second check string c2 on the basis of the random string P and the first Y1 and the second key number Y2. Thereafter the second communication device 3 compares the string c1 entered by the user to the calculated second check string c2. The second communication device 3 indicates the result of the check for example with a signal and/or on the display 7b, advantageously at least when the check strings c1, c2 do not match. Thus, the user can notice the situation and refrain from starting the data transmission process. If the strings are identical, it can be assumed that the first Y1 and the second key number Y2 are reliable, i.e. with a strong probability the keys are the same in both devices.

In all the above-presented preferred embodiments, the user of the first communication device 2 and the user of the second communication device 3 can be different persons, or the same person can operate both communication devices 2, 3. If the users are two different persons, it is possible to report the check sum c1, c2 orally or by means of another reliable method in which the users can be sure that the information has been really transmitted by the person in question, not by an outsider.

The method according to the invention can be applied especially in such systems in which the key exchange is conducted by means of a method based on asymmetric encryption, wherein it is possible to prevent passive eavesdropping, but an intervention by a third party is possible. Furthermore, it must be possible to verify the communication devices 2, 3, i.e. it is mainly possible to use short-range systems in which the users can see both communication devices 2, 3. Thus, the invention is especially advantageous in temporary short-range data transmission connections, for example in the wireless coupling of peripheral devices to a data processing device, when the user is logging in to a wireless local area network by means of a wireless data processing device, etc.

It is obvious that the present invention is not limited solely to the above-presented embodiments, but it can be modified within the scope of the appended claims.

The invention claimed is:

1. A system for checking that earlier derived encryption keys, a first encryption key in a first device and a second encryption key in a second device, are the same, comprising:
   a first device and a second device;
   the first device comprising: a first control block and a first communication block;
   the second device comprising: a second control block and a second communication block;
   wherein said first communication block and said second communication block are configured to establish a connection between said first and second devices;
   wherein said first control block is configured to:
   generate a random string,
   calculate a first check string based at least partly on said random string and said first encryption key, and
   display said random string and said first check string;
   wherein said second control block is configured to:
   receive said random string and said first check string,
   calculate a second check string based at least partly on said random string and said second encryption key, and
   compare the correspondence of said first and second check strings to verify that said first encryption key and said second encryption key are the same, and
   indicate the result of the comparison.

2. The system according to claim 1, wherein a user reads said random string and said first check string from said first device, and enters said random string and said first check string to the input module of said second device.

3. A method for checking that earlier derived first encryption key in a first device and a second encryption key in a second device are the same, the method comprising:
generating, by the first device, a random string,
calculating, by the first device, a first check string based at least partly on said random string and said first encryption key, and
displaying, by the first device, said random string and said first check string;
wherein said random string is for enabling the second device to calculate a second check string based at least partly on said random string and said second encryption key;
wherein said first check string is for comparing the correspondence of said first and second check strings to verify that said first encryption key and said second encryption key are the same.

4. The method according to claim 3, further comprising transmitting said random string to said second device.

5. A method for checking that earlier derived encryption keys, a first encryption key in a first device and a second encryption key in a second device, are the same, comprising:
receiving, by the second device, a random string and a first check string,
calculating, by the second device, a second check string based at least partly on said random string and said second encryption key, and
comparing, by the second device, the correspondence of said first and second check strings to verify that said first encryption key and said second encryption key are the same, and
indicating, by the second device, the result of the comparison.

6. A system for checking that earlier derived encryption keys, a first encryption key in a first device and a second encryption key in a second device, are the same, comprising:
a first device and a second device;
the first device comprising: a first control block and a first communication block;
the second device comprising: a second control block and a second communication block;
wherein said first communication block and said second communication block are configured to establish a connection between said first and second devices;
wherein said first control block is configured to:
generate a random string,
calculate a first check string based at least partly on said random string and said first encryption key,
display said random string and said first check string, and
transmit said random string to said second device;
wherein said second control block is configured to:
receive said random string,
calculate a second check string based at least partly on said random string and said second encryption key, and
display said second check string.

7. A method for checking that earlier derived encryption keys, a first encryption key in a first device and a second encryption key in a second device, are the same, comprising:
receiving, by the second device, a random string,
calculating, by the second device, a second check string based at least partly on said random string and said second encryption key, and
displaying, by the second device, said second check string;
wherein said random string is for enabling the first device to calculate a first check string based at least partly on said random string and said first encryption key;
wherein said second check string is for comparing the correspondence of said first and second check strings to verify that said first encryption key and said second encryption key are the same.

8. A device comprising:
a memory;
a processing device configured to generate a random string, and to calculate a first check string based at least partly on said random string and a first encryption key; and
a display configured to display said random string and said first check string;
wherein said random string is for enabling a second device to calculate a second check string based at least partly on said random string and a second encryption key; and
wherein the processing device is further configured to compare the correspondence of said first and second check strings to verify that said first encryption key and said second encryption key are the same.

9. The device according to claim 8, wherein said processor is configured to derive said first encryption key.

10. The device according to claim 8, further comprising a transmitter configured to transmit said first check string.

11. The device according to claim 8, comprising an input module for inputting the result of the comparison.

12. A device comprising:
a memory;
a receiver configured to receive a random string and a first check string calculated in a first device based at least partly on the random string and a first encryption key; and
a processing device configured to:
calculate a second check string based at least partly on said random string and a second encryption key,
compare the correspondence of said first and second check strings to verify that said first encryption key and said second encryption key are the same, and
indicate the result of the comparison.

13. The device according to claim 12, wherein said processor is configured to derive said second encryption key.

14. The device according to claim 12, wherein said processor is configured to perform the comparison.

15. The device according to claim 12, comprising an input for inputting said random string.

16. The device according to claim 12, comprising a display to indicate the result of the comparison at least when the first check string and the second check string do not correspond to each other.

17. The device according to claim 12, a transmitter configured to report the result of the comparison to said first device.

18. The device according to claim 12, comprising a display to display said random string and said second check string.

19. The device according to claim 12, comprising an input module for inputting the result of the comparison.

20. A device comprising:
a memory;
a receiver configured to receive a random string,
a processing device configured to calculate a second check string based at least partly on said random string and a second encryption key; and
a display configured to display the second check string; and
wherein said second check string is for comparing the correspondence of said first and second check strings to verify that said first encryption key and said second encryption key are the same.

21. The device according to claim 20, wherein said processor is configured to perform the comparison.

22. The device according to claim 20, wherein said receiver is configured to receive said first check string.

23. The device according to claim 20, further comprising an input for inputting said random string.

24. The device according to claim 20, wherein the display is further configured to indicate the result of the comparison at least when the first check string and the second check string do not correspond to each other.

25. The device according to claim 20, further comprising a transmitter configured to report the result of the comparison to said first device.

26. The device according to claim 20, wherein the display is further configured to display said random string.

27. The device according to claim 20, comprising an input module for inputting the result of the comparison.

* * * * *

UNITED STATES PATENT AND TRADEMARK OFFICE
CERTIFICATE OF CORRECTION

PATENT NO.         : 7,995,760 B2                                Page 1 of 1
APPLICATION NO.    : 10/164437
DATED              : August 9, 2011
INVENTOR(S)        : Kaisa Nyberg and Valtteri Niemi It is certified that error appears in the above-identified patent and that said Letters Patent is hereby corrected as shown below:

Title Page, Item (57) Abstract: should be replaced with --A method for ensuring data transmission security between a first and a second communication device in short-range wireless communication sets up a secure data transmission connection, wherein the communication devices conduct a key exchange stage to generate at least one shared key between the communication devices. After the key exchange stage at least a first and a second check string is formed, the strings being based at least on a unique short random string and on the keys generated in each communication device at the key exchange stage. Thus, the security of the connection that is set up is ensured by comparing the correspondence of the check strings. The invention also relates to a communication system and a communication device, in which the method is applied.--

Signed and Sealed this
First Day of November, 2011

David J. Kappos
*Director of the United States Patent and Trademark Office*